(12) United States Patent
Basinger et al.

(10) Patent No.: US 7,088,239 B2
(45) Date of Patent: Aug. 8, 2006

(54) METHOD AND APPARATUS FOR ALL-PURPOSE, AUTOMATIC REMOTE UTILITY METER READING, UTILITY SHUT OFF, AND HAZARD WARNING AND CORRECTION

(76) Inventors: Vann Basinger, 1638 SE. McBrod, Milwaukie, OR (US) 97222; Gerald F. Larer, 13515 SE. Laurie Ave., Milwaukie, OR (US) 97222

( * ) Notice: Subject to any disclaimer, the term of this patent is extended or adjusted under 35 U.S.C. 154(b) by 84 days.

(21) Appl. No.: 10/792,482

(22) Filed: Mar. 2, 2004

(65) Prior Publication Data
US 2005/0195078 A1 Sep. 8, 2005

(51) Int. Cl.
*G08B 1/08* (2006.01)
(52) U.S. Cl. .................. 340/539.17; 340/539.22; 340/539.27; 340/628
(58) Field of Classification Search .......... 340/539.17, 340/539.22, 539.26, 539.27, 628, 632, 630
See application file for complete search history.

(56) References Cited

U.S. PATENT DOCUMENTS

| | | | |
|---|---|---|---|
| 4,086,434 A * | 4/1978 | Bocchi | 379/91.01 |
| 4,642,635 A | 2/1987 | Snaper | |
| 5,381,462 A | 1/1995 | Larson et al. | |
| 5,438,329 A | 8/1995 | Gastouniotis et al. | |
| 5,619,192 A | 4/1997 | Ayala | |
| 5,748,104 A * | 5/1998 | Argyroudis et al. | 340/870.11 |
| 5,940,009 A | 8/1999 | Loy et al. | |
| 5,943,394 A * | 8/1999 | Ader et al. | 379/40 |
| 6,069,571 A | 5/2000 | Tell | |
| 6,078,255 A | 6/2000 | Dividok et al. | |
| 6,181,294 B1 | 1/2001 | Porter et al. | |
| 6,473,668 B1 | 10/2002 | Abuzeid et al. | |
| 6,504,357 B1 | 1/2003 | Hemminger et al. | |
| 6,650,242 B1 | 11/2003 | Clerk et al. | |
| 6,705,340 B1 * | 3/2004 | McGill et al. | 137/315.06 |
| 6,860,288 B1 * | 3/2005 | Uhler | 137/552 |
| 6,892,751 B1 * | 5/2005 | Sanders | 137/312 |
| 2003/0122686 A1 | 7/2003 | Ehrke et al. | |

OTHER PUBLICATIONS

Fireboy of Quincy MA. auto fire extinguisher Model HFC-227 and their automatic engine shutoff/override system in the 3000,5000,& 8000 series.
Thermo Electro Corp. FX-IR Single Gas Transmitter Model 67-0022-1.

(Continued)

*Primary Examiner*—Toan N. Pham

(57) ABSTRACT

Apparatus for routine monitoring and automatic reporting of electrical power and gas utility usage also provides means for detecting and reporting to the relevant utility companies, fire department, and other emergency responders the development of local hazards on premises at which one or more utility usage meters are installed, including the occurrence of a fire, a gas leak, or any other circumstances such as medical emergencies that demand fast response. Such reporting can include automatic reporting of both zero or excess electrical current draw or zero or excess gas usage. The system is clock driven, fully programmable, and expandable to such other types of sensors as would detect and report on such circumstances as the presence of noxious materials as in a chem/bio attack. A permanent record of all reported events is made.

45 Claims, 3 Drawing Sheets

OTHER PUBLICATIONS

Omega Engineering Inc. Valve Model SV-300, Supplied under "OMEGA-FLO 2 Way General Purpose".

CCI Controls. Gas Leak Detector Alarm Model 7773 or Alarm and Gas Valve Shutoff Model 7239.

General Motors Inc. Flammable Gas Hydrcarbons Detector 1R5000.

HUMICAP thin-film polymer sensor by the Vaisala Group of Vantaa, Finland.

Silent Knight Co. of Maple Grove,MN. Fire Alarm Control Communicator SK-5208 and Remote Annunciator SK-5235.

Telemecanique Global Detection. A wide range of Optical Sensors, Light Cables and the like.

* cited by examiner

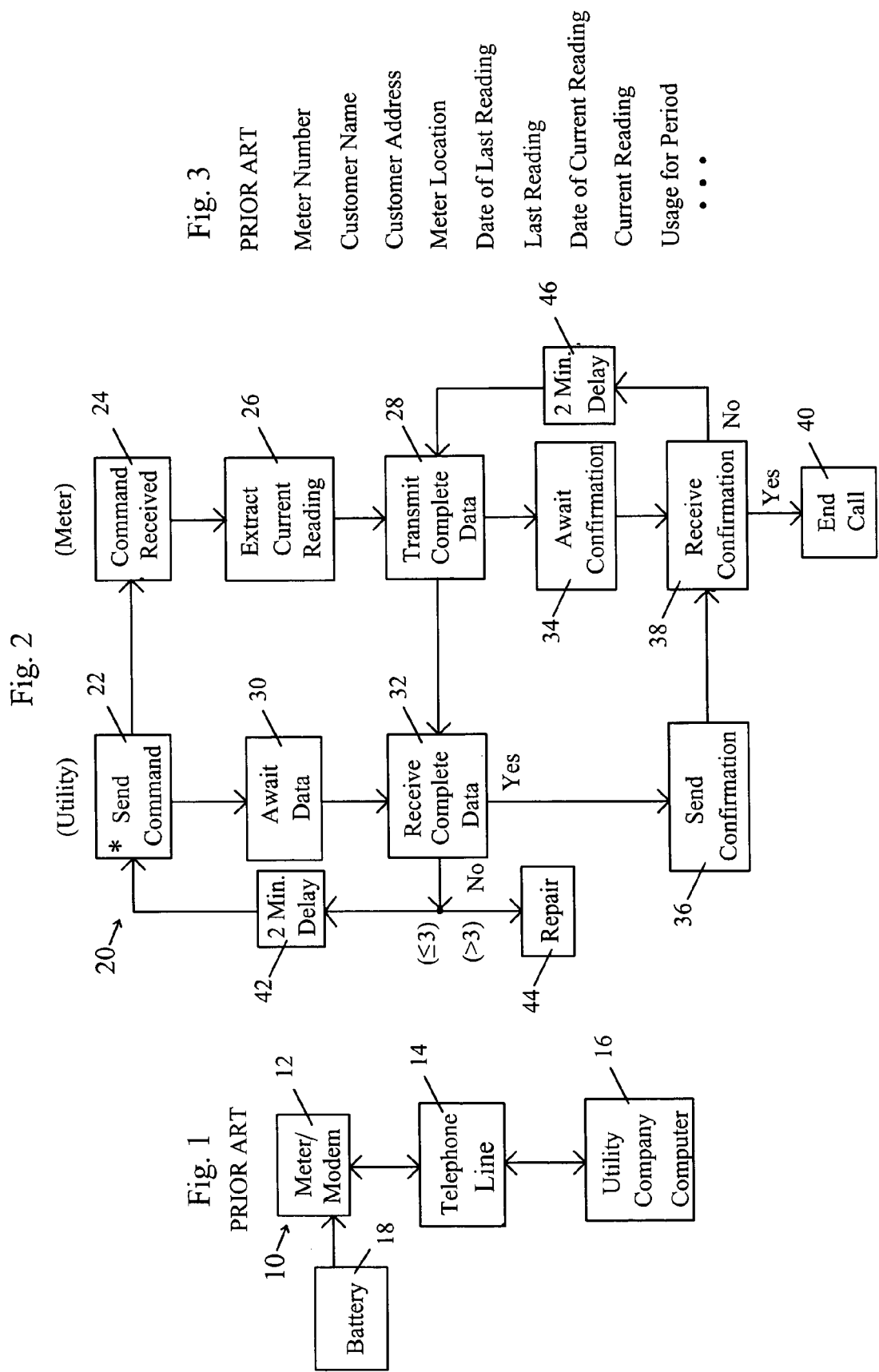

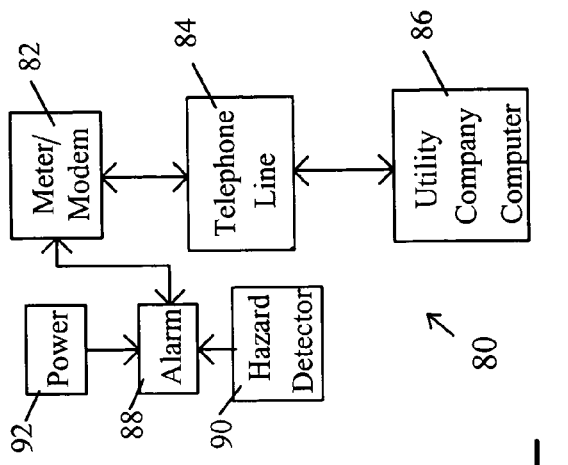
Fig. 6
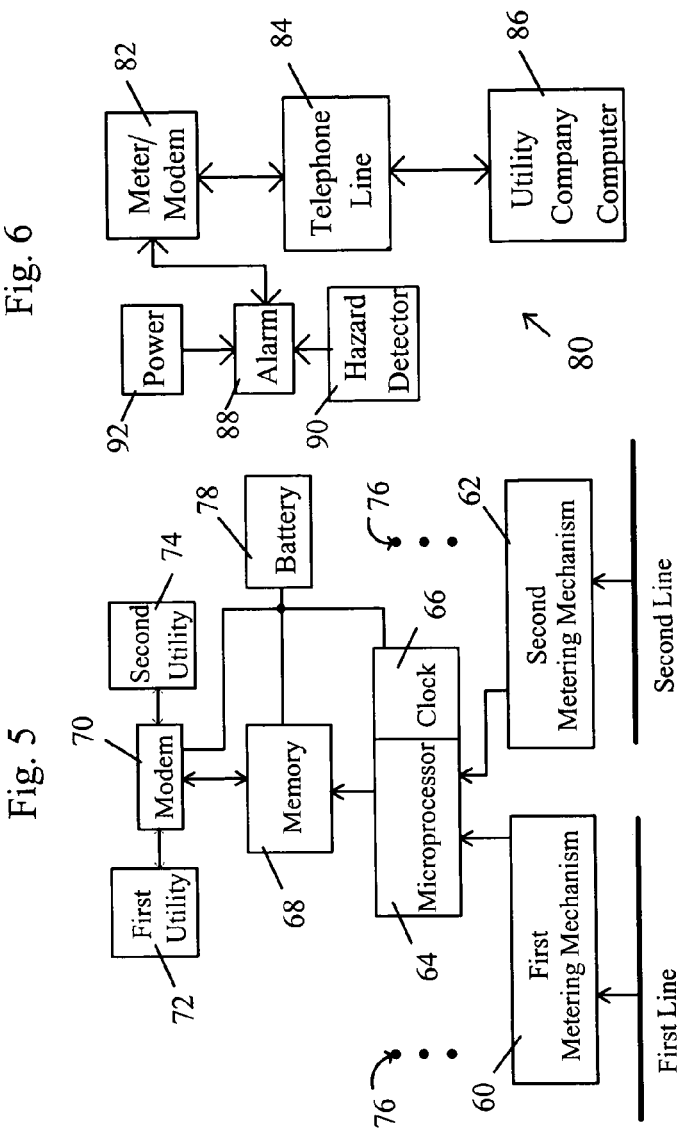
Fig. 5
Fig. 4

METHOD AND APPARATUS FOR ALL-PURPOSE, AUTOMATIC REMOTE UTILITY METER READING, UTILITY SHUT OFF, AND HAZARD WARNING AND CORRECTION

CROSS-REFERENCE TO RELATED APPLICATIONS

None

STATEMENT REGARDING FEDERALLY SPONSORED RESEARCH OR DEVELOPMENT

Not applicable

REFERENCE TO A "SEQUENCE LISTING"

Not applicable

BACKGROUND OF THE INVENTION

1. Field of the Invention

This invention relates generally to the remote sensing art, and more specifically to apparatus for remote utility meter reading, including responses at the premises to fires, gas leaks, and other hazards, by sending alarms to utility companies, the fire department, and other emergency responders, and also emergency adjustment of electricity and gas connections.

2. Background Information

An important task of utility companies that provide households and businesses with electrical power, gas, water and the like is the reading of the meters that have been installed at those locations in order to apply appropriate monthly charges for having provided the service. That effort can be expensive and time consuming, if it is necessary for company employees to travel to each place that receives such service and read the meters that have been installed to measure the utility usage. Such work is also dangerous and expensive, with meter readers having had traffic accidents, and the like, or having to pay for insurance policies that would compensate for such events. Difficulty even in reading those meters can also arise, perhaps because a home owner keeps a dog in the yard, or shrubbery has been allowed to grow up over the meter, or the like. In fact, in some cases it has become the practice of utility companies to prohibit installation of meters behind a fence, which may require the use of extended lines running from the home or other building, which can be particularly expensive in the case of gas lines. For these reasons, much effort has been made to accomplish such meter reading remotely, preferably automatically, so that a minimum of costly human intervention would be involved. Filed with this application is an Information Disclosure Statement that sets out a number of issued patents in which it was sought to carry out remote meter reading. The present invention will be seen neither to have been anticipated nor suggested by any of that prior work, whether taken separately or in combination.

At the same time, it could be important to obtain other information by such remote means that is not presently collected, particularly as to any malfunctions or errors in the use and operation of the utility equipment, or indeed emergency situations in which a particular house or business may have caught fire, or a gas leak has developed. Warning of the existence of a fire or gas leak is of course important in its own right, but it is also important to know what the condition may be of the utility (electricity or gas) equipment. Even more importantly, when no one happens to be in the home or at the office, it would be extremely useful if protection were provided against some emergency situations automatically. In factories or the like, water sprinkler systems that will turn on when a fire breaks out will often have been installed, but such equipment may be deemed not appropriate to the home, and typically no other such protection is provided. Even so, the present invention includes the capability of automatic activation of strategically placed fire extinguishers. With respect to electrical power, since insulation burns and electrical shorts can create even more fire, the continued presence of live electrical power in the context of a fire can be dangerous, both as to adding more fire and, perhaps by inadvertent contact with the house wiring, to the firefighters that will be arriving to get the fire under control. Similarly, the heat of a fire may break a gas line, and the release of such gas would undoubtedly increase the fire substantially, and even more dangerously may bring about an explosion.

What is needed and would be very important for safety reasons, therefore, is a means by which the operation of the electrical and gas services would be shut off as soon after the outbreak of a fire as possible, or as soon as a gas leak was detected, and the firefighters should be made aware of that condition before they arrive at the site so as not to enter into any attempt, perhaps dangerously, to turn off either the electricity or gas, which would not be necessary if that had already been done. Turning off those services would often help to minimize the effects of the fire, or prevent a gas explosion, and the work of the firefighters could then be carried out more safely. Under situations such as a barricaded felon, or hostage circumstances and the like, it would also be useful for police departments to have remote means of controlling the furnishing of utilities. The present invention thus provides a method and apparatus by which either or both the electrical and gas services would be shut off automatically at the outbreak of a fire or occurrence of a gas leak, while at the same time providing remote notice both of the existence of the fire or gas leak and of the status of the electric and gas utility. Such an early warning would permit an earlier intervention in the fire or gas leak, so as to bring the particular circumstance under control and indeed to put out the fire or repair the gas leak, and the initial and dangerous step of turning off the electric power and gas in the midst of actual fire fighting would be avoided. It would also be appropriate for the respective utility companies to provide, to the owner of the home or other building, instructions that announce the presence of this shutoff capability, actions with respect to such facilities that such owner either should take or would not be allowed to take, and the circumstances under which the equipment would be used, as part of the service contract.

SUMMARY OF THE INVENTION

A utility meter that measures either electrical power or gas consumption either has a dedicated telephone connected thereto or preferably the telephone is integral to the meter, but in either case also having a modem within or connected to the meter so that either upon command or on a predetermined schedule, preferably at off-peak hours, the telephone will dial the phone number of the responsible electrical power or gas companies and in some cases various emergency responders such as the fire department and transmit to that company or other entity a report of the current readings on the gas or electric meter, and other information as the situation may require. If it was sought to use for this meter reading and other purposes described below the same telephone line as that used for conversation or internet connection by those living in the home or working in the business, the meter preferably includes the ability to "break in" on any telephone call that was in process and carry out the various functions set out below. For similar reasons of providing immediate access by the apparatus comprising the invention, such services as "call waiting" and the like are preferably excluded from the line in order that its constant availability can be assured, and in a preferred embodiment a line is used that is dedicated entirely to use by the invention and has no other function.

Unless the context clearly indicates otherwise, reference hereinafter either to a "meter" or a "meter/modem" will mean the same in either case, i.e., the meter itself, together with a modem and connection to a telephone line, either integrally within the meter or separately connected. Similarly, the term "telephone" by itself will mean a connection from that modem to a line, i.e., an ordinary telephone line or by cable or other such means, including a meter antenna in the case of cellular phone transmission, through which a computer at the relevant utility company and the fire department can be contacted. For rural areas, in which farm houses may be isolated and have either poor or even no regular telephone service on fixed lines, the use of cellular phones may be optimal, together with the growing practice of placing a conspicuously sign along the highway, at the proximal end of a driveway that may extend back to a house that is not visible from the highway, an assigned number that is known to the fire department and other emergency responders in order that such responder will realize that the premises sought has in fact been located.

The programming of a command schedule is carried out by a computer owned by the responsible utility company, or that programming could be carried out at the meter itself using installed programming means. Whether the programming is carried out at a remote computer or locally, that program will also include the periodic running of self-diagnostics both of the data transmission facilities and the operability of various sensors as a "backup" procedure for ensuring system reliability. A customer number or other such identification that has been assigned to the meter at a particular house or business, perhaps by way of the meter telephone number of the telephone attached thereto, or the address of the location at which the meter is installed, is registered in the computer at each relevant utility company so that the location of the meter from which a call has been received is immediately and automatically recorded. Upon receipt by the meter of a command from that computer, or by its own command, the total usage of electricity or gas is transmitted to the utility company computer, from which the usage over some preceding period, typically a month, can be calculated, and the billing for such usage can then be carried out, based on the identification of the customer using information previously stored in the computer that pertain to the phone number or address from which the call was made, or by other identifying information. The meter may instead or also have an incremental meter scale that will record only the usage over such preceding period, being reset to zero upon a scheduled reading, so that only the electricity or gas usage during that period would be sent to the company computer. The scheduling of meter readings, on a basis such as monthly, can also be done automatically by way of a clock, either the clock associated with the utility company computer or one contained within the meter. That clock could also be used to generate a command to read the meter at the time of startup or cutoff of service, or for similar such reasons. The utility company computer, as well as the on-site computer system, e.g. the microprocessor and associated memory and the like at the meter as will be described in more detail below, are entirely conventional in design, use conventional programming, data transmission and other procedures, and will be known to a person of ordinary skill in the art. However, one feature of the invention is that the programming of the on-site device can be, and preferably is, carried out from the main utility company computer that also has complete access to the premises device in other respects.

Upon receipt of a meter reading from a meter at some home or business, either of total or incremental usage, the company computer will transmit back a confirmation of such receipt, and reset to zero the incremental meter if that type of reading had been used. Upon the computer failing to receive any transmission in response to its command, or at the time that the transmission had been scheduled, that computer will first check as to whether or not it had properly sent its command or transmission schedule to the meter, and make whatever adjustments of the computer as may be necessary to accomplish a successful command or schedule transmission. Then, after some predetermined number of unsuccessful attempts at transmission of that command or otherwise receive the data transmission, utility repair personnel would be sent to the site of the meter to determine whether its commands were not being received, even though properly sent, the schedule had not been properly entered, or those commands were being received but the meter telephone for some reason was not properly transmitting the meter readings, and so on, and based on those findings any appropriate repair would be made. If it were found that the problem was merely one of temporary excess "noise" on the lines, the transmission of the command could be postponed and then attempted later. In the same way, since transmission by the meter of the meter readings should result in the receipt by the meter telephone of the confirmation of receipt of the usage data by the company computer, and upon any failure to receive such confirmation, the meter would likewise carry out a predetermined number of attempts at such transmission, and the identification and repair of any equipment failure, or in some cases merely postpone the transmission if it were found that the problem was simply one of temporary noise on the lines.

Other circumstances may also require intervention by the remote computer in the operation of the local meter, including turning on or off the supply of either the electrical power or the gas, perhaps as a result of the utility user not having made timely payments of the bill for the usage of the particular utility and then paying that bill, to permit carrying out maintenance in the neighborhood in which the meter is located, or for other reasons such as intervention by the police in some tactical situation. Fundamentally, however, provision is made for either or both the electricity or gas to be shut off in the event of fire or a gas leak. The prior practice of remote turnoff of power, gas, or the like, as for the nonpayment of a bill, has been that of a remote disconnection, which at least as to gas would still leave an amount of gas in the lines leading for some distance into the premises. In the present system, however, as will be seen below, that turnoff is done right at the meter, or very near to it, and upon a gas leak there is less gas that could leak into the premises and perhaps ultimately explode.

Consequently, the electricity or gas meter is also connected to an appropriate "on/off" switch or valve that controls the electricity or gas, and in some cases would turn such utility on or off upon receipt of a command so to do from the remote utility computer. Manual operation of such controls is also provided, but the principal means of operation of the meter and related switching so as to cut off the electricity or gas derives from connection to alarms within the facility, whether a home or a business, warehouse, etc. Confirmation of the receipt of such a command by the meter from the computer is sent from the meter to the remote computer, followed by notice that the command in question has been executed, or if turning off the electricity or gas had been initiated locally, either manually or automatically in response to an alarm, notice of that event would also be sent to a computer at the relevant utility company or companies, and when appropriate to the fire department. In the event of failure of the remote computer to receive a notice that was to be responsive to its own command transmission, after some predetermined time period after the transmission of the command, or a sequence of attempts at such transmission, the remote computer would carry out the same kind of "troubleshooting" and repair procedure as was described above.

More specifically, and particularly for purposes of intervention in the event of a fire or other such hazard, including an onset of an illness requiring emergency response, the meter can also be activated locally, either manually or automatically by command from the alarm(s) installed within the house or business to which alarm(s) the meter/modem is also connected. Preferably, manual activation is by way of an array of pre-programmed phone numbers, e.g., for the fire department, police, gas company, ambulance service, etc., that would be selected by the user based on the nature of the need. This feature would be an equivalent of a "911" call, except that the remote recipient of the call would be selected, and in the event the user was not able to converse, a pre-recorded message containing the identity of the caller and other relevant information would be sent to that call recipient. The same "outside" line can be used for the electricity and gas meters and various hazard detectors, selection among these being made by the telephone numbers that a microprocessor in the respective meters had been programmed to call, and by separate lines from sensors that will detect a fire or gas leak at appropriate locations in the home, office or other facility to those meter/modems, given that the gas and electric meters will often have different physical locations.

Upon signal from an alarm in the home or other facility, notice of a fire or gas leak would be sent both to the fire department and to each relevant utility company, particularly including sending the location information to the fire department that would have identifying information in its computer in the same way as do the utility companies. Connection of respective meters to the gas or electrical system would then bring about shutoff of either or both the gas and electricity, and besides notice of the fire itself, notice of such shutoff is also sent to the fire department and to the respective utility company computers. The fire fighters who would then arrive at the scene to fight the fire or perhaps evacuate people in the event of a gas leak, would thereby be made aware from the fire department's own computer that the electricity or gas, or both, would have been shut off so as to present no danger to them, although, in the interest of confirming that protection, they would preferably make their own examination of the status of the electrical and gas switches or valves, assuming that there was safe access thereto. Depending on circumstances, i.e., as to whether or not additional electrical power might be needed by the fire fighters in order to carry out their firefighting or for purposes of providing medical attention or the like, provision would be made by which the automatic shutoff of the electricity could be locally overridden.

Alternatively, notice of the fire only would be sent by the meter telephone to the fire station computer, wherein the fire station would have direct telephone connection through the meter telephone to the "on/off" switch or valve by which the electrical power and gas are controlled, so the fire fighter personnel could themselves decide whether or not to shut off either or both the electrical power or the gas, based either on their own knowledge of the particular situation at the indicated household or business or from their access to that same information in the remote computer. If not already done, fire department personnel would also send notice to the utility companies both of the fire and of any actions that the fire fighters might have taken in response to that fire, including shutting off either or both the electricity and/or the gas.

BRIEF DESCRIPTION OF THE SEVERAL VIEWS OF THE DRAWINGS

A preferred embodiment of the invention, which should be viewed as an example only and not in any way to limit the scope of the invention, will be described in detail below with reference to the accompanying drawings. Since the additional connections as to a second utility involves essentially the creation of a second, parallel flow chart branch and set of device connections, the addition of a similar type of flow chart and connections as to yet a third or more meters and telephones, perhaps for a large factory or other large building, would be done in the same way, hence the drawings in which more than one utility is shown should be interpreted to mean "two or more" utilities and/or alarms, and of course then the remainder of such a system. Respective drawings for these various implementations and aspects of the invention, in which like numbers are used for like devices throughout the series of drawings, are as follows:

FIG. 1 is a block diagram of a system from the prior art having a meter/modem unit that encompasses just the meter reading function as to a single utility.

FIG. 2 is a flow chart that outlines a first implementation of the invention shown in FIG. 1 involving only the meter reading aspect of either an electric or a gas utility.

FIG. 3 indicates from the prior art an example of the kind of information to be transmitted between the meter and the utility company.

FIG. 4 is a more detailed block diagram of the meter/modem unit of FIG. 1 that includes aspects of the invention.

FIG. 5 is a block diagram of an alternative embodiment of the meter/modem of FIG. 4, including the addition of one or more metering mechanisms and corresponding means for transmitting data to the relevant utility company.

FIG. 6 is a block diagram of a second aspect of the invention that includes giving notice of the outbreak of a fire or gas leak at the premises.

DETAILED DESCRIPTION OF THE INVENTION

Figure 7:
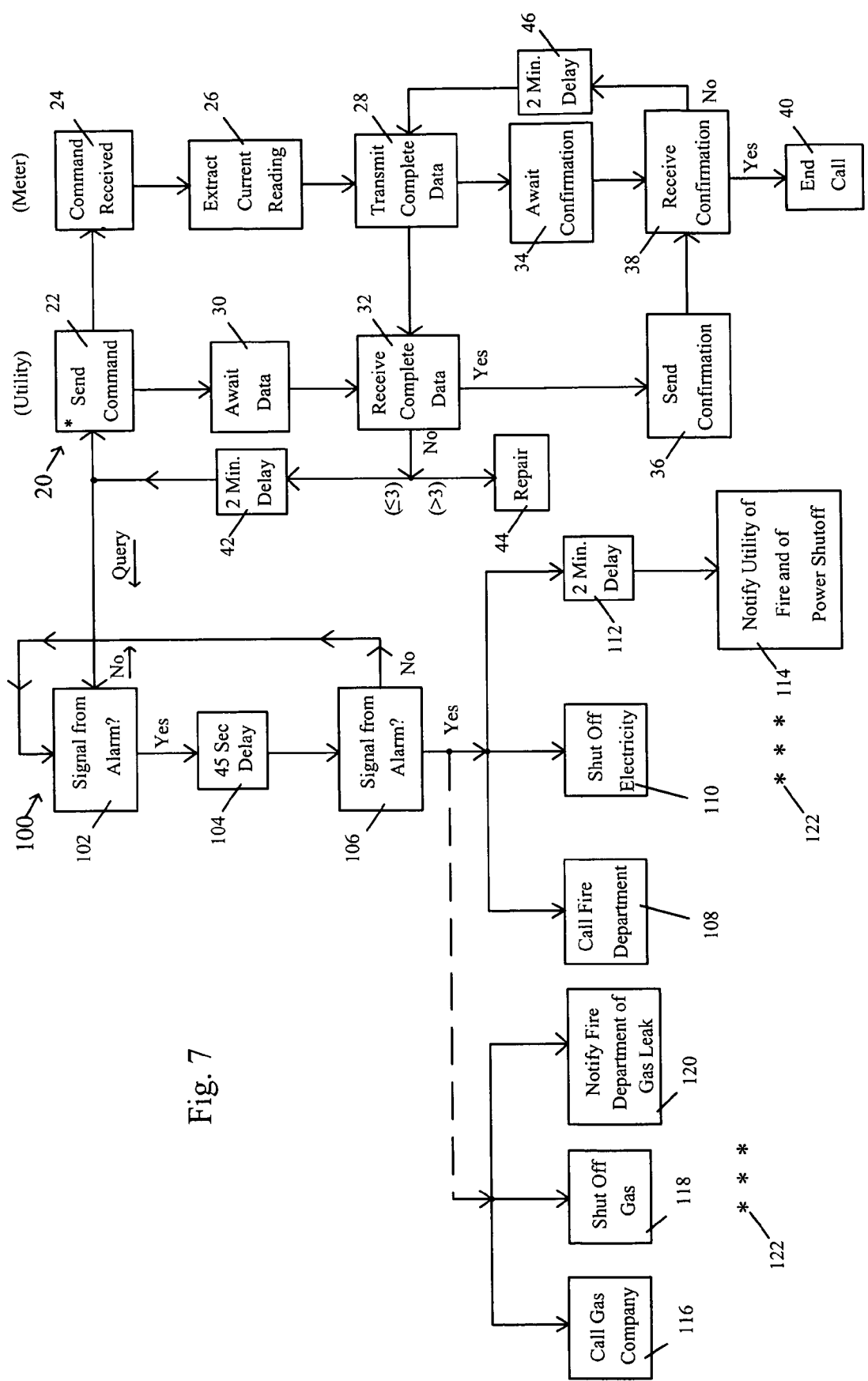
FIG. 7 is a flow chart outlining the functioning of the apparatus of FIG. 6 as to two or more different or similar utilities.

A first embodiment of the invention includes data transmission system 10 shown in FIG. 1 that carries out first process 20 shown in the flow chart of FIG. 2, thus to transmit from meter/modem 12 through telephone line 14 to utility company computer 16 (e.g., an electric or a gas utility), the information listed in FIG. 3, which includes identification data for the meter, the current meter reading, and other relevant information, either listed as such or having memory space allocated therefor as indicated by the ellipsis at the bottom of FIG. 3. A remote recipient for hazard notices and the like, such as the fire department, is also represented by computer 16. The ellipsis at the bottom of FIG. 3 is intended to indicate that other information than that explicitly shown in FIG. 3 can also be included. Telephone line 14 can be of the ordinary type, or may be an optical "light pipe," a cable, cellular antenna or any other such means of communication, but since the data to be transmitted is to be in digital form, the line must be of a quality to carry such data, and meter/modem 12 and computer 16 must of course include a modem. Ensuing processes then occur as noted below so as to place data sent from the meter/modem 12 to computer 16 to be entered into computer 16, and computer 16 is correspondingly adapted to receive, store and act on such data, and send commands to meter/modem 12, all of which employs standard equipment and occurs in the ordinary manner as will be known to a person of ordinary skill in the art. In case of a power failure, FIG. 1 shows meter/modem 12 backed up by battery 18.

In routine use, the foregoing processes are initiated by a command sent from the company computer 16, as shown by the "Send Command" box 22 in the upper left hand corner of FIG. 2 and the asterisk ("*") therein that designates the start of the process. In FIG. 2, the "action boxes" thereof appear essentially in two vertical columns, with those on the left referring to events at the utility company, that column being labeled "Utility," and the events in the column on the right take place at meter/modem 12, with that column being labeled as "Meter." The command sent from computer 16 as indicated in the "Send Command" box 22 should then be duly received by meter/modem 12 as shown in the "Command Received" box 24 in the upper right hand corner of FIG. 2. All of the data shown in FIG. 3 except for the last two entries (for the "Current Reading" and "Usage for Period") will already be stored in meter/modem 12, of which a more detailed structure will be shown and described below. The meter reading sought by the aforesaid command and then read by meter/modem 12 is shown by the "Extract Current Reading" box 26 in FIG. 2 to which the "Command Received" box 24 connects, which may be either or both the total usage, either of electricity or gas, or it may be an incremental value that directly measures the usage since the last reading. If only a total usage value is reported, computer 16 will draw on its historical data as held in memory therein to obtain the previous meter reading, and then calculate the amount of usage since that last meter reading, for purposes of billing. (By "current" reading is meant, of course, not electrical current, but rather the reading on the meter at the particular time.)

The "Transmit Complete Data" box 28 is connected to "Extract Current Reading" box 26 for purposes of receiving not only that current meter reading but also all of the prior-listed data in FIG. 3. The "Usage for Period" entry in FIG. 3 could also be calculated within meter/modem 12 from the total usage reading, could be read directly by an incremental meter, could be calculated by computer 16 upon receipt thereto of the total usage data and then sent back to meter 12, or that "Usage for Period" could be deleted entirely, with the calculation of incremental usage data taking place only in company computer 16 as was previously described.

While the usage data are being extracted and transmitted by meter/modem 12, computer 16 would have been awaiting those data as shown in the "Await Data" box 30 to which, in the "Utility" sequence, the "Send Command" box 22 is connected. The "Await Data" box 30 then connects to the "Receive Complete Data" box 32, to which is connected the "Transmit Complete Data" box 28 in the right-hand "Meter" course of events. With all equipment operating and the various steps being properly carried out, meter/modem 12 would have been at the "Await Confirmation" box 34 connected below "Transmit Complete Data" box 28 in the "Meter" sequence, the "Receive Complete Data" box 32 on the "Utility" side then connecting on a "Yes" line to "Send Confirmation" box 36 which in turn connects back to the "Receive Confirmation" box 38 in the "Meter" sequence, which in turn connects along another "Yes" line in the "Meter" sequence to the "End Call" box 40. Computer 16 would then have the data necessary to calculate out and otherwise administer a new billing to the customer indicated in the data sent by meter/modem 12. An operational error at any point in that course of events will bring forth alternative events that will now be described.

The first external indication of an operational error would appear as a failure of computer 16 to receive the meter reading from meter/modem 12, although of course that failure may not lie in computer 16 itself but instead either in meter/modem 12 or line 14. In any event, besides the "Yes" line extending downwardly from "Receive Complete Data" box 32 on the "Utility" side of FIG. 2, there is also a "No" line extending leftward from "Receive Complete Data" box 32 either to impose a two-minute delay as shown by the "2 Min. Delay" box 42, which extends either upwardly back to "Send Command" box 22, or to the "Repair" box 44. The choice of which way to go can be pre-programmed, and in this particular instance of the invention, as shown by the "≦3" and ">3" notations in FIG. 2, successive attempts to confirm reception of the complete data will be repeated three times (to take account, for example, of a possible temporarily noisy phone line or the like), but after that no further attempt is made and repair of the problem is sought instead. The "≦3" designation on the upward pointing part of that "No" line refers to there being up to three attempts, while the ">3" designation on the downward pointing part of that "No" line indicates that after three attempts, repair of the problem will be sought instead. The occurrence of such a sequence can be programmed, either at computer 16 or at meter/modem 12 (if so equipped), and the specification here of a two minute delay and three attempts are examples only, which could be set differently as to either of those values as conditions warranted. Computer 16 has an ordinary screen display (not shown) onto which, should such event occur, computer 16 will "post" a notice that an anticipated data reception had not been received, so that the utility company personnel will be made aware that an operational error has occurred hence the action indicated by "Repair" box 44 should be carried out.

By the act of transmitting a meter reading at "Transmit Complete Data" box 28, the programming of meter/modem 12 is placed into the mode of "Await Confirmation" box 34, i.e., it is expected that confirmation of receipt of the reading would shortly be received from computer 12. (If an incremental reading of meter/modem 12 were in use, that confirmation message would also "zero" that incremental reading device; in other words the reading device would simply be a digital counter having enough range to encompass reading at least the usual amount of kilowatt-hours for a month, and analogously for gas consumption, and "zeroing"

by computer 16 would merely be to send to meter/modem 12 an ordinary "reset" bit as will be known to persons of ordinary skill in the art.) However, it might be that all of the requisite data were properly transmitted by meter/modem 12 to computer 16, but after transmitting the data at "Transmit Complete Data" box 28 and passing into the stage of "Await Confirmation" box 34, there was no confirmation received by meter/modem 12 at the "Receive Confirmation" box 38. To illustrate that circumstance, "Receive Confirmation" box 38, besides having a "Yes" line that ends the call at "End Call" box 38, also has a "No" line that extends to another "2 Min. Delay" box 46. From there another line extends upwardly and back to the "Transmit Complete Data" box 28, from which a second attempt at sending the data from meter/modem 12 to computer 16 is carried out. Although computer 16 may in fact have received the complete data but yet failed to notify meter/modem 12 of that fact, such retransmission of that data would indicate at computer 16 that the confirmation had either not been properly sent or at least had not been received at meter/modem 12, and that meter/modem 12 was still seeking such a confirmation. In any case, initiation of a second command transmission from "Send Command" box 22 will initiate a second instance in which meter/modem 12 would have been signaled to expect a confirmation, hence it is not necessary to add further repetitions of the confirmation-related "2 Min. Delay" box 46: for each attempted transmission (other than an initially successful one) there will be a two-minute delay both at meter/modem 12 and at computer 16, and as previously noted, there would be no fourth attempt but recourse to "Repair" box 44 instead.

Repetition of the confirmation process at meter/modem 12 can be used to "trouble-shoot" the operation, since a case in which meter/modem 12 kept repeating the sending of data, but yet the data in computer 16 were found by examination to be new data actually received, the problem would then have been isolated to the confirmation process. It is important that confirmation be properly carried out, since that step is used not only to terminate a given transmission of data, but also, in the event that the data sent pertained not to total usage but to incremental usage, that confirmation must also "zero" that incremental meter for the next reading.

FIG. 4 now shows meter/modem 12 in greater detail. Specifically, metering mechanism 50 represents the device that actually measures either the usage of electrical power or the gas consumption, as attached to the lines carrying the electricity or gas. The structure and function of such meters is well known to a person of ordinary skill in the art and need not be discussed further, except to point out that the result of a reading, although often shown for view by a dial or the like on the meter itself, for reading by the human eye, must for present purposes also have been converted to digital form as in ordinary binary code, binary coded decimal (BCD) or the like, likewise in a manner that will be well known to a person of ordinary skill in that art. The data so recorded are transferred from metering mechanism 50 by microprocessor 52 into memory 54. The term "microprocessor" is meant here in a general sense and can, for example, include an Application Specific Integrated Circuit (ASIC), a "System on a Chip" (SoC), a Field Programmable Gate Array (FPGA) or the like, provided that provision is also made to carry out the functions to be described below, and providing further that preferably microprocessor 52 includes a crystal clock 56 or the like for purposes of defining a time schedule (e.g., monthly) of meter readings. Battery 59 provides backup power in the event of a power failure to the microprocessor 52, memory 54, clock 56 and modem 58. Microprocessor 52 is further programmed to transmit notice to the electric utility computer 16 (FIG. 1) of a power failure.

As noted earlier, the programming of microprocessor 52 is a matter well known to those of ordinary skill in the art, but a specific instance of so doing is presented in U.S. Pat. No. 6,672,151 issued Jan. 6, 2004, to Schultz et al., which patent by this reference is hereby incorporated herein as though fully set forth. Although this patent centers on application to a tire pressure sensor (Col. 3, lines 26–27), the circuitry and other aspects set out therein are easily adaptable to the full array of sensors noted elsewhere herein. In that patent, in fact, the tire inspection pressure device is adapted to the measurement of the pressure in the tanks of the fire extinguishers (Col. 11, lines 33 ff.) for inspection and maintenance purposes, and measurements can be initiated by an operator (Col. 15, lines 27–30). Reference is also made to measuring weight (Col. 22, lines 1–3) and other contexts such as refrigeration devices, air conditioners, and the like, both as installed (Col. 22, lines 12–16) or as a quality control step in the manufacture of such devices (Col. 22, lines 26–29; 48–50), or in natural gas lines or liquid propane tanks (Col. 22, line 61–Col. 23, line 9), but does not address or suggest the range of functions that are set out herein as to the present invention.

Concerning the present invention, therefore, for actual fire fighting purposes (as opposed to maintenance) there is provided by Fireboy® and of Quincy, Mass., both (1) an automatic fire extinguisher in its HFC-227ea model that uses heptafluoropropane as the smothering agent, and discharge is initiated at 175° F; and (2) an automatic engine shutoff/override system in their series 3000, 5000 and 8000 series systems, both of which devices are deemed to be applicable to and operable in the system of hazard protection set out herein as concerns fires. This particular Fireboy® fire extinguisher, for example, can be operated manually as well as automatically, and such manual operation can easily be modified to be operable remotely under the control of microprocessor 52 under a programming process such as that of Schultz et al. '151, since the tire pressure sensor noted in that patent is operable by a microprocessor (Col. 4, lines 16–17). An example of such a microprocessor is given in Schultz et al. '151 as the HMOS-E single component 8-bit microcomputer 8748H from Intel (Col. 4, lines 63–65), and specific examples of other components are also set forth that would be under the remote control of microprocessor 52 under a programming process such as that of Schultz et al. '151, i.e., IR emitters Model No. LD271 from Seimens-Litronix (Col. 5, lines 13–14), photo transistor No. Model BP103-B from Seimens-Litronix (Col. 5 lines 28, 29), comparator Model No. LM339 from National Semiconductor (Col. 5, lines 41–42), a BCD-to-7 segment latch/decoder Model No. MC54/74H4511 from Motorola (Col. 5, lines 59–60), segment display Model. No. FNF500 from Fairchild Semiconductor (Col. 5, lines 64 –65), tone decoder Model No. LM567 also from Fairchild Semiconductor (Col. 6, lines 49 –51), pressure sensor Model No. 24 OPC from Microswitch (Col. 6, lines 8 –9), voltage-to-frequency converter (VF) Model No. AD654 from Analog Devices; either a Signetics 80C751 or NEC micro PD75304 microprocessor (Col 25, lines 31 –35), a Signetics PCF8577 controller; a Schmidt 14093 NAND gate (Col. 26, lines 14 –15), a standare 9-volt D battery such as the Eveready #522, an LTE5208A infrared LED from Light-On (Col. 26, lines 37 –38), a Signetics TDA3047 infrared preamplifier (Col. 26, lines 47 –48), infrared detector LTR-316AG from Light-On (Col. 27, lines 33 –35), a standard 4.7 volt 1 NS230 zener diode, a Nova Sensor #NPH pressure sensor (Col. 27, lines 59–60) or other suppliers such as Honeywell or IC Sensors (Col. 27, lines 65–67; a National ADC0801 8-bit A/D converter (Col. 28, lines 22–23); a 1.2 volt LM385 zener diode (Col. 28, lines 26–27); a Motorola 14021 8-bit shift register (Col. 28, lines 36–38); another zener diode, which may be an LTE5208A from Light-On; a Signetics TDA 3047 infrared preamplifier (Col. 28, lines 66–67); an Eveready #CR2045 lithium oxide button batter (Col. 29, lines 37–38); 14903 Schmidt NAND gates from Motorola (Col 29, lines 54–55); and a Motorola 2N4403 transistor from Motorola (Col. 29, lines 61–62). The Shultz et al. infrared receiver can receive signals at distances of approximately 3–5 feet (Col. 23, lines 38–41) from the sensor, which could be installed to read water pressure in lines to a water sprinkler system, and hence could be used in the present invention to detect the turning on of a water sprinkler in lieu of the "moisture detector," humidity meter, or oximeter adaptations as discussed further below.

Occasion so to cause remote manual operation might arise in a case in which it was important to turn on those extinguishers at which the temperature had not yet reached the "trigger temperature" (175° F.) of those extinguishers. Similarly, the mechanism of shutting down a boat engine can easily be adapted to the mechanics of shutting off, say, a valve of a gas line as described herein. The kind of computer control necessary for these purposes is described in Shultz et al. '151 at Col. 14, line 62–Col. 15, line 1: "A CPU based system as is well known in the art comprises: a control circuit for maintaining the proper sequence of events with regard to interrupts, instructions, wait requests, and timing functions, an arithmetic logic unit (ALU) for performing arithmetic and logic operations, and various registers for program counting, an instruction decoder, and addressing unit." These are the basic components incorporated within what is referred to generally herein as microprocessor 52.

Upon command from computer 16 in accordance with a pre-programmed schedule, by manual intervention, or in response to an emergency situation as will be described below, modem 58 will be provided with the current reading as stored in memory 54, together with the other data listed in FIG. 3 as shown in the "Extract Current Reading" box 26 in FIG. 2, and then transmit the entirety of that data to computer 16 in accordance with the "Transmit Complete Data" box 28 of FIG. 2. Modem 58 will of course be configured to dial the proper utility company telephone number for the modem that serves as an input port to computer 16. The other activities outlined in FIG. 2 will of course proceed as before, the present description being intended only to provide more detail as to the functioning of whatever modem may be in use.

FIG. 5 now shows a second embodiment of the invention wherein two or more utility companies are configured to receive meter readings. Both first metering mechanism 60 and second metering mechanism 62 are seen to collect usage data from respective first and second lines (which respectively could be electricity and gas lines, or both could be gas lines or both electric lines), whereupon microprocessor 64 and clock 66 then cause the data so received to be sent to memory 68. Those data will of course be stored and otherwise treated as separate and distinguishable entries into memory 68. Coincident with that practice, memory 68 will have had stored therewithin the respective phone numbers of the computers at the two utilities, if two are involved, so that the usage data recorded by first and second metering mechanisms 60, 62 will be sent by modem 70 to the proper utility, i.e., to first utility 72 and second utility 74, respectively. The procedures set out in FIG. 2, adapted to serve two or utility companies, will of course proceed as before.

The two ellipses 76 shown (vertically) on respective sides of microprocessor 64 and clock 66 are intended to show that additional power usage data from other meters could be gathered and transmitted to the proper utility companies. Such a procedure need not involve any more utility companies, but could instead involve a number of different meter readings from different meters that would be sent to a single utility. This could be the case, e.g., in an apartment building in which the several apartments were individually metered for electricity usage.

Battery 78 in FIG. 5 provides backup power in the event of a power failure to microprocessor 64, clock 66, memory 68, and modem 70. Microprocessor 64 is further programmed to transmit notice to the electric utility computer 16 (FIG. 1) of any such power failure, i.e., the discontinuance of any use of electricity. That procedure would provide earlier notice to the electric company of such failure than does the common practice in which one would "call the electric company when the power goes out," and moreover, if a pattern of such notices were to be received essentially simultaneously from sites throughout a single neighborhood, the accumulation of such reports would show immediately that the electric company had a problem "in the field," such as a lightning strike or vehicle collision at a telephone pole transformer, or perhaps the entry of a bird or squirrel into the lines at a substation.

It is also advantageous that microprocessor 64 be programmed to show as well any surge of power usage beyond that, say, of the startup of an electric motor, such as to show a level of current flow that would indicate a short circuit. Such a warning, if heeded by identifying and eliminating the source of such a short circuit, might indeed forestall the development of a fire, or perhaps at least "catch it" before it has reached a point of a fire that would set off the alarm. The metering mechanism would be taking readings continually in any event, and it would be well within the knowledge of a person of ordinary skill in the art to program into microprocessor 52 in FIG. 4 or microprocessor 64 in FIG. 5 a threshold level, so that any reading above that level would indicate that a short circuit had been formed and hence modem 58 (FIG. 4) or modem 70 (FIG. 5) would receive instruction to transmit notice thereof to company computer 16 (FIG. 1). The complete cessation of power, indicated by the lack of any electrical current flow at all, would indicate a power failure that would likewise be so reported.

It should be emphasized that in light of the foregoing "hazard" warning function, and of other hazard types as will be discussed below, if the phone line used by the invention is shared with ordinary phone usage, or with an internet connection, provision is made by which the present apparatus will "break in" to any such use to report a hazard. That is, a short "bypass" to the ordinary phone line is provided, along with switching means that will connect that bypass through to the external phone line while at the same time disconnecting the ordinary straight line connection thereto of the "house phone" or the like.

With that type of warning mechanism in mind, an important additional function of the invention lies in providing notice to both the fire company and the (respective) utility company(ies) of the outbreak of a fire, or of a gas leak, at a home or at other buildings. The occurrence of a fire or gas leak, or even a power failure or sudden electrical current surge, would constitute a "hazard" in the premises itself as opposed to an operational error in the system described above that reports on the normal course of events. For that reason, one or more fire alarms and/or gas detectors are also connected to the utility usage meter, whereby to send notice that a fire or a gas leak has occurred, but further in the electrical system to record the current being drawn, which could fall to zero or be excessive. FIG. 6 thus shows an embodiment of the invention that for purposes of simplicity will treat only a single utility, but may be applied to several utilities and/or companies in the manner of FIG. 5, and in addition to the routine provision of utility usage data will also send notice, upon such event occurring, that a fire has broken out, a gas leak has been detected, or there is an abnormal draw of electrical current at the premises —or again, preferably all of those functions can be employed. Indeed, a burglar alarm system can also be connected to meter/modem 58, 70, or 72 for like purposes, in which case the microprocessor 52, 64 would need to be programmed accordingly, including provision in meter/modem 58, 70, or 82, for calling the police and/or a private security company.

Such usage could employ a motion detector such as that described by U.S. Pat. No. 6,650,242 issued Nov. 18, 2003, to Clerk et al. This patent relates directly to providing warnings in a warehouse or the like of the movement of vehicles or people relative to injury hazards, using a rotatable infrared (IR) fan beam derived from light emitting diodes (LEDs) directed from a mobile vehicle to warn of the approach thereof, but would equally apply to having that fan beam emission at a fixed site to warn of the approach of a person. Detection in Clerk et al. '242 itself is by way of an IR detector device worn either by company personnel or placed at strategic plant locations that will respond with an audible or visible warning upon coming into contact with the IR beam from the vehicle as that vehicle approaches, but it could be possible to mount the detector near the IR source and rely on reflection from a person approaching to detect that person's presence, or of course other motion detector devices might be employed instead.

In such a fixed site situation, connection would be made to meter/modem 12 as in the other cases described. Other sources of hazard of concern that might be detected, as by various types of detectors of a "chem/bio" terrorist attack, may be included among the connections to meter/modem 12 for "homeland defense" purposes, and the programming of microprocessor 64 with respect to selecting the intended remote recipient of each type of hazard will incorporate the instructions necessary to respond to such events. For convenience, all of such abnormal events are herein designated to be "hazards." The present invention, in short, provides not only the recording and reporting of utility usage data, but is broad enough in design to encompass the wide range of additional hazard warning functions as described herein. It is a particular feature of the invention, indeed, that microprocessor 64 is programmed to store within memory 68, which may be a hard drive, for example, a permanent record both of utility usage data and any fire, gas leak, or other hazard events and the like for accounting, administrative, insurance, legal, or other purposes.

Among the events automatically reported on, for which operations the necessary programming within microprocessor 64 is provided, are included the occurrence of any extremes in the usage of either or both electrical power and gas. Zero electrical power usage, i.e., a "power failure," can be life threatening either from the point of view simply of extreme cold weather or in the event a resident of a home subsists on a kidney dialysis machine or the like, while excessive electrical power usage can mean the occurrence of a "short" from which may come the outbreak of a fire. The same life threat applies as to gas usage in the event of zero usage, at least as to the weather, and an indication of excessive gas usage, which should also have been reported by a gas leak detector if such were the case (and for which the automatic reporting here being discussed would serve as a "backup" in the event of failure in the gas leak detector), could indicate an inability of the residents, because of old age or the like, to adjust their environment properly for which some assistance might be needed.

With regard to various hazard detectors, beginning with a gas leak, for example, the Thermo Electron Corporation provides an FX-IR Single Gas Transmitter, Model 67-0022-1, that detects gas at the "trace" level and can be adapted for the detection of a gas leak in a manner appropriate to this particular remote warning context. That is, this instrument operates on 3-phase power, possibly providing analog data with a response time of 12 seconds, and hence, in that case, microprocessor 64, for example, must be provided with an analog-to-digital converter ("A/D" or "ADC") in order to provide a reading that will generate a warning signal from microprocessor 64. That feature of proving digital data is in fact an option available to the hazard detector, and since the addition of a switch or relay to the detector is also an option, this detector can also, and preferably will, be used to turn off the gas supply upon the occurrence of a gas leak, provided that the gas line itself has been provided with a valve that is operable by such a switch or relay. An example of such a valve is that provided by OMEGA Engineering, Inc., in its model SV-300 supplied under the name "OMEGA-FLO™ 2-Way General Purpose," which is manually set but can then be "tripped" (i.e., closed) electrically, as would occur upon receiving a signal so to do from the aforesaid gas leak detector.

Similarly, CCI Controls provides a gas leak detector that incorporates either an alarm only facility in its model 7773, or both the alarm and valve shutoff of the gas supply in its model 7239, and up to three such units can be interconnected so as to operate in tandem on a single output line. The valve sizes range from ⅜ inch to one inch, and hence can be used in either a household or an industrial context. Included in these instruments is the facility to analyze the ambient weather and seasonal weather conditions so as to adjust the sensor threshold point in order to avoid "false alarms." Once the gas supply is turned off at the valve, that gas will remain off until manually turned back on. These detectors also have a battery backup in the event of an electrical power failure. Again, these detectors may require conversion of the "alarm" output therefrom to digital form as previously described in order to be employed in the present invention. General Motors, Inc., also provides its !R5000 flammable gas hydrocarbons detector that cites a measurement range of "0 –5000 ppm" for trace measurements, and having a response time of 8 seconds. A wide range of optical sensors, light cables, and the like from Telemecanique Global Detection iso btainable from SquareD.

As to such a system as a whole, FIG. 6 shows in block diagram form a simplified version of such an arrangement, and FIG. 7 is a flow chart that demonstrates the procedures carried out by the apparatus of FIG. 6. The apparatus is similar to that shown in FIG. 1, but with the addition of connections either or both to a fire alarm device and a gas leak detector, or to other such hazard detectors. That is, meter/alarm system 80 of FIG. 6 is seen to include the usual meter/modem 82, a telephone line (which as noted earlier could be a cable, a cellular antenna, etc.), and utility company computer 86, but now with the addition of alarm 88 that upon responding, say, to smoke as with a smoke alarm, or the detection of a gas leak, would transmit a "fire" or "gas leak" signal to meter/modem 82. The manner that is used by meter/modem 82 to receive an alarm signal of any type can be direct and automatic, wherein alarm 88 sends a signal to meter/modem 82 immediately upon detection of a hazard, or meter/modem 82 can periodically query alarm 88 for the presence of an alarm indication, the former method being preferred. The actual detection of a hazard such as a fire, gas leak, or other such dangerous event as noted herein is carried about by hazard detector 90, that may detect smoke, a gas leak, etc., that connects to alarm 88. In the case of a water sprinkler system, the "hazard" detected would not be the fire as such but rather the fact that the water sprinkler system had been turned on to spray water because of a local fire, as noted below. Also shown in FIG. 6 is a line from "Alarm" box 88 to "Power" box 92, at which the utility in question can be shut off as will be described further below.

It should be noted that notification of a fire can arise not only from an ordinary smoke detector, typically of an electronic type, but also by the activation of a water sprinkler system, if appropriate detectors are provided at a sprinkler outlet that water has begun to course therefrom. Such a detector might possibly be provided, for example, by adaptation of the "moisture detector" described in U.S. Pat. No. 4,377,783 issued Mar. 22, 1983, to Wagner, which patent is by this reference incorporated herein in its entirety as though fully set forth. An ordinary humidity detector would serve the same purpose, one example of such a humidity probe being the HUMICAP® thin-film polymer sensor offered by the Vaisala Group of Vantaa, Finland. Either of these two devices would of course need to include A/D converters and the other standard means for acquiring transmittable digital data. For this purpose, the Schultz et al. '151 system noted above, or an adaptation of the infrared components of a commercial oximeter that measures blood pressure could also be employed.

As one example pertaining to a water sprinkler system, the Silent Knight company of Maple Grove, Minn., provides its SK-5208 Fire Alarm Control Communicator that is specifically adapted to control water sprinkler systems as installed in manufacturing plants, warehouses, schools, and the like, and also provides its SK-5235 Remote Annunciator that allows remote programming along with other accessories. The actual detection of fires, however, rests on the usual smoke alarms, of either the ionization or photoelectric type, there being no provision in the Silent Knight products of means for noting at a central control panel the automatic turning on of a sprinkler system as a result of events at the actual site of the sprinkler system, as would be provided either by a water flow detector adapted from the Wagner '783 patent as noted above or by a humidity measuring device such as the Vaisala Group HUMICAP® thin-film polymer sensor noted above. In either such case, the device would need to include means for recognizing a hazard, e.g., by including means for entering a predefined threshold value, the later measurement of which would be taken to be an indication of a reportable hazard, and such alarm would then be sent to meter/modem 82 immediately upon detection of a hazard, and meter/modem 82 would then carry out the several processes as have previously been described.

The procedure to be followed requires only that the alarm device, be it a smoke detector, a sprinkler system, a gas leak detector, humidity or moisture detector or the like, be provided with appropriate indicator means by which a query sent to it by meter/modem 82 would yield a measurement response, or such device on its own volition, will provide different indications depending upon whether or not the sensor device has responded to the occurrence of whatever stimulus to which the device was designed to respond. The one could be a smoke detector, as noted above, or a water sprinkler system would include a sensor that would detect the ejection of water from a sprinkler such as that just noted, and the same procedure would apply to a gas leak detector.

The rightward part of FIG. 7 is essentially a duplicate of FIG. 2, and indeed retains the same reference numerals, but has had added thereto the steps involved in responding to an alarm in accordance with FIG. 6. That is, the right side of FIG. 7 includes everything in the flow diagram shown in FIG. 2, but with alarm system 100 now shown on the left side of FIG. 7. The normal operations as previously described with reference to FIG. 2 will be carried out as before, independently of the operations of the attached alarm system 100. Consequently, no further description of the first process 20 of FIG. 2 and now shown again in FIG. 7 is necessary here, and only alarm system 100 will be described, but to include the fact that the processes of alarm system 100 may serve also to terminate those of FIG. 2 as shown on the right side of FIG. 7 —continued readings of meter/modem 82 in FIG. 6 would clearly be inapplicable if alarm system 100 had turned off the utility —and hence the two processes are shown to be linked.

The process mentioned earlier in which meter/modem 82 automatically receives "status reports" from the alarm system will now be described, commencing with the "Signal From Alarm" box 102. It may be noted that in FIG. 6, the arrow that connects alarm box 88 to meter/modem 82 is bidirectional, meaning that queries can be sent from meter/modem 82 to alarm box 88, which in turn can send a response back to meter/modem 82, either in response to a query or on its own volition. As noted above, the system can be programmed to send a query to alarm box 88 only on initial startup, the processes shown on the left side of FIG. 7 then taking control; alarm box 88 can be "self-starting" and then automatic so that no queries at all were used; or at the other extreme repetitive queries from meter/modem 82 to alarm 88 might be used. The "Signal From Alarm" box 102 in FIG. 7 is bidirectional with respect to its connection to the "Send Command" box 22 of FIG. 7 for the same reason. It should be emphasized that all of first process 20 continues as before, with first process 20 being carried out in the apparatus of FIG. 6, while at the same time the alarm process 100 shown to the left in FIG. 7 likewise proceeds, also using the apparatus of FIG. 6, and quite independently of first process 20 that is taking place on the right side of FIG. 7 (other than to terminate the first process 20 in the event the utility referred to is turned off by second process 100).

The devices shown in FIG. 4 are taken here to represent as well the structure that is applicable to meter/modem 82 of FIG. 6 and hence to the operations shown in FIG. 7. At the same time, the operations of FIG. 7 also depend on the elements of FIG. 6, especially alarm 88. In operation, while "Send Command" box 22 is initiating process 20 because of having received either an internal, timed command from microprocessor 52 of FIG. 4 so to transmit that had been programmed within microprocessor 52 or had received a command from the utility company computer 16, microprocessor 52 of FIG. 4 has also sent a query to alarm 88 of FIG. 6 as to whether or not alarm 88 has detected a fire or gas leak. That query step is shown by the leftward pointing arrow head of FIG. 7, with the associated line being labeled "No —Query." One query initiates this second process involving alarm 88, and after that alarm 88 continues to test for the occurrence of a fire or gas leak. (In fact, depending upon how the system was programmed, what has been termed a "Query" may be nothing more than the initial powering up of alarm 88.) Unlike the delay processes used in first process 20 that tests only three times as to whether or not the utility company computer 16 has received the data from meter/modem 88, as shown in the "Receive Complete Data" box 32 of FIGS. 2 and 7, the testing for the presence of a fire, a gas leak, or any other hazard is repeated indefinitely, and continues such testing as long as the apparatus is operating.

That manner of carrying out that repetitive testing is shown in the line of FIG. 7 that extends down from a first "Signal from Alarm?" box 102 to the "45 Sec. Delay" box 104, and thence to a second "Signal from Alarm?" box 106. The rightward pointing arrow head on the "No"- "Query" line between the first "Signal from Alarm?" box 102 to the "Send Command" box 22 in the first process sends a "No" signal, hence a presumed absence of a fire or gas leak or other hazard is reported, while at the same time that "No" result of the test also enters into a 45 second delay, as shown by the aforesaid line extending down from the first "Signal from Alarm?" box 102 to the "45 Sec. Delay" box 104. The purpose of that short delay is to determine whether or not that first alarm might have been a "false alarm," that would be shown by there being no repetition of that alarm in the second "Signal from Alarm?" box 104 that connects to the bottom of "45 Sec. Delay" box 104. If there is no such second alarm, the "No" line extending from second "Signal from Alarm?" box 104 back up to first "Signal from Alarm?" box 102 then continues the routine monitoring for an alarm. A "Yes" response in second "Signal from Alarm?" box 104, however, indicates that the first such alarm was not a false alarm, and hence a hazard reporting sequence is commenced. That 45 second delay could of course be set by microprocessor 52 of FIG. 4 to any time delay that was deemed appropriate, the 45 second delay being shown only as an example. The rate at which the apparatus in its entirety tests for the presence of a fire or gas leak is similarly programmed in meter/modem 82, i.e., in microprocessor 52 of FIG. 4, since again FIG. 4 shows the internal structure of meter/modem 82 of FIG. 7.

The following description assumes certain priorities as to the order in which the several events arising from a fire or gas leak might be set, but as in other aspects of the description as previously given, circumstances may dictate different priorities, in which case different priorities would be programmed into microprocessor 52. Upon the occurrence of a fire (the gas leak case will be described further below), or more exactly upon the sensor in Alarm 88 of FIG. 6 indicating that a fire has broken out, the "Yes" line extending down from second "Signal from Alarm?" box 106 leads to several responses, i.e., that "Yes" line has several branches, the first two of which lead to "Call Fire Department" box 108 and "Shut Off Electricity" box 110. That is, upon the indication of a fire, the fire department is called first, through the programming of microprocessor 52 of FIG. 4, and at the same time the electrical power is shut off by that same programming, as indicated by the branch line of that "Yes" line that extends down to "Shut Off Electricity" box 110. The connection required to cause that shut down is shown by the line that extends from "Alarm" box 88 down to "Power" box 92, wherein by "Power" is generally meant either the electrical power or the gas supply.

The procedure as to the utility shut off is that upon events reaching "Shut Off Electricity" box 110 or "Shut Off Gas" box 118, a signal so to do is sent from meter/modem 82 to "Alarm" box 88, and that command is then sent to "Power" box 92 to accomplish the shutoff. Then after another two minute delay, as shown by the branch of the "Yes" line that extends down to another "2 Min. Delay" box 112, that same program causes a call to be sent to the electric company, as shown by the line extending from "2 Min. Delay" box 112 down to "Notify Utility of Fire and of Power Shutoff" box 114, the assumption being that there is not much that the electric company could do about a fire at the premises, hence the notification to the company can be delayed until after the matter of the fire itself has been addressed by way of notice to the fire department.

In extending the capacity of the system to the reporting of gas leaks, as shown by the dotted line extending to the left in FIG. 7 from just below the second "Signal from Alarm?" box 106, it is assumed that the priorities would be different. That is, the first response to the discovery of a gas leak would be assumed to be having the gas supply shut off, and for that reason the first response to such a detection is shown as "Call Gas Company" box 116 to which the aforesaid dotted line from second "Signal from Alarm?" box 106 is connected. Also shown is "Shut Off Gas" box 118, likewise connected to second "Signal from Alarm?" box 106, to include the case in which there is the capability right at the premises to shut off the gas as previously described. Although no specific delay is shown, the third priority of action following the detection of a gas leak is shown by "Notify Fire Department of Gas Leak" box 120, for the purpose of warning that facility that there may be an impending disaster at the premises, although nothing had yet occurred, and the fire department could then respond as deemed appropriate. Asterisks 122 in FIG. 7 are intended to show, as was shown by ellipses 76 in FIG. 5, that additional utilities, whether electric or gas, can also be accepted by the system described with proper programming of microprocessor 52. An important part of the system as a whole, as was set out by the preceding description of the invention, is that if a telephone line or like communication means is used that is also used, say, by a resident family for personal phone calls, the apparatus of the invention is provided with means for interrupting any such phone calls and then carrying out its own processes as have been described.

The specific apparatus and procedures set forth above are of course exemplary only and not limiting, and as has been indicated, a specific embodiment of the invention, or such variations therefrom as would be obvious to a person of ordinary skill in the art, must be taken also to be encompassed by the invention, which is to be interpreted and construed only in light of the following claims.

We claim:

1. Utility monitoring apparatus comprising:
   utility usage metering means;
   utility usage reporting means;
   utility hazard detection means;
   utility hazard reporting means; and
   confirmation means, wherein said confirmation means comprise:
   data transmission means for sending information from a local utility meter to a remote computer;
   data reception means for the reception of said information within said remote computer;
   confirmation transmission means within said remote computer for the transmission by said remote computer of confirmation information to said local utility meter confirming reception of said information from said local utility meter; and
   confirmation reception means within said local utility meter wherein said data reception means include means for repeated transmission of data in the event said data reception means fail to detect reception of message, and to give notice of a need for repair if repeated data transmissions are not successful.

2. The apparatus of claim 1 wherein said utility comprises electrical power.

3. The apparatus of claim 1 wherein said utility comprises natural gas and said hazard further comprises other dangerous gases and liquids.

4. The apparatus of claim 3 wherein said hazard detection means comprises a gas leak detector.

5. The apparatus of claim 4 further comprising means for transmitting a report to one or more remote recipients the fact that a gas leak has occurred at a premises at which said utility monitoring means is located.

6. The apparatus of claim 5 wherein said apparatus automatically transmits a report to one or more remote recipients the fact that a gas leak has been detected at a premises at which said utility monitoring means is located.

7. The apparatus of claim 6 wherein following a predetermined delay said apparatus will automatically recheck to determine whether said alarm has continued to generate a report, and if not will foreclose the transmittal of said report as first generated.

8. The apparatus of claim 3 wherein said utility usage metering means and utility usage reporting means further comprise means for reporting zero gas usage upon the occurrence of zero gas usage.

9. The apparatus of claim 3 wherein said utility usage metering means and utility usage reporting means further comprise automatic means for reporting zero gas usage upon the occurrence of zero gas usage.

10. The apparatus of claim 9 wherein said utility usage metering means and utility usage reporting means further comprises automatic means for reporting excessive gas usage upon the occurrence of excessive gas usage.

11. The apparatus of claim 1 wherein said hazard detection means comprises a fire alarm.

12. The apparatus of claim 11 further comprising means for transmitting a report to one or more remote recipients the fact that a fire has occurred at a premises at which said utility monitoring means is located.

13. The apparatus of claim 12 wherein said apparatus automatically transmits a report to one or more remote recipients the fact that a fire has occurred at a premises at which said utility monitoring means is located.

14. The apparatus of claim 13 wherein following a predetermined delay said apparatus will automatically recheck to determine whether said alarm has continued to generate a report, and if not will foreclose the transmittal of said report as first generated.

15. The apparatus of claim 12 wherein, at the time of sending said report that a fire had occurred, a second action taken is to shut off the electrical power in the premises.

16. The apparatus of claim 12 wherein, at the time of sending said report that a fire had occurred, a second action taken is to shut off the natural gas in the premises.

17. The apparatus of claim 1 wherein said hazard detection means comprises electrical current monitoring means.

18. The apparatus of claim 17 wherein said electrical current monitoring means further comprises means for detecting zero electrical current and means for transmitting notice of said zero electrical current to an electrical utility company.

19. The apparatus of claim 18 wherein said apparatus automatically transmits notice of said zero electrical current to an electrical utility company.

20. The apparatus of claim 17 wherein said electrical current monitoring means further comprises means for detecting excessive electrical current and means for transmitting notice of said excessive electrical current to an electrical utility company.

21. The apparatus of claim 20 wherein said apparatus automatically transmits notice of said excessive electrical current to an electrical utility company.

22. The utility monitoring apparatus of claim 17 wherein said electrical current monitoring means further comprises a second microprocessor response level for purposes of detecting electrical power surges that could forewarn against the outbreak of a fire.

23. The apparatus of claim 1 wherein said utility usage and utility hazard reporting means comprise sensor means, data collection means, data transmission means, data reception means, data processing means, error detection means, and error correction means.

24. The apparatus of claim 23 wherein said error detection means further comprises means for sending confirmation data from said data reception means to said data collection means confirming that utility usage data from said data collection means had been successfully reported to said data reception means.

25. The apparatus of claim 23 wherein said error resolution means further comprises means for repetitive use of said error detection means a predetermined number of times, followed by identification and repair of any malfunction in the operation of said sensor means, data collection means, data transmission means, data reception means, and data processing means.

26. The apparatus of claim 23 wherein said utility hazard detection means comprises water sprinkler means adapted to detect and report the turning on of a water sprinkler system.

27. The apparatus of claim 26 wherein said water sprinkler means comprises water sprinkler detection means and water sprinkler reporting means.

28. The apparatus of claim 26 wherein said water sprinkler detection means comprises sensor means.

29. The apparatus of claim 26 wherein said water sprinkler detection means comprises data collection means.

30. The apparatus of claim 26 wherein said water sprinkler reporting means comprises data transmission means.

31. The apparatus of claim 26 wherein said water sprinkler reporting means comprises data reception means.

32. The apparatus of claim 26 wherein said water sprinkler reporting means comprises data processing means.

33. The apparatus of claim 26 wherein said water sprinkler detection means comprises error detection means.

34. The apparatus of claim 26 wherein said water sprinkler detection means comprises error correction means.

35. The apparatus of claim 1 further comprising hazard correction means.

36. The apparatus of claim 35 wherein said hazard correction means comprises fire suppressant means and the automatic activation of said fire suppressant means upon the detection of a fire.

37. The apparatus of claim 35 wherein said hazard correction means comprises gas shutoff means and the automatic activation of said gas shutoff means upon the detection of a gas leak.

38. The apparatus of claim 1 further comprising self-diagnostic means adapted to test and report on the operational capability of said utility usage metering means, utility usage reporting means, utility hazard detection means, and utility hazard reporting means at the time of any such test.

39. The apparatus of claim 1 further comprising means for turning off and on from a remote source the provision of electrical power at a premises receiving said electrical power.

40. The apparatus of claim 1 further comprising means for turning off and on from a remote source the provision of gas at a premises receiving said gas.

41. The apparatus of claim 1 further comprising data recording means adapted to receive digital data, wherein said digital data may be provided from either or both of said utility usage metering means and/or said utility hazard detection means, and placing into digital memory a record of said digital data as obtained from using either or both of said utility usage metering means and/or said utility hazard detection means.

42. The apparatus of claim 1 wherein said hazard detection means further comprise burglar alarm means.

43. A method of reporting utility usage comprising:
providing utility usage monitoring means to establish utility usage data;
providing utility usage data processing means;
providing means for transmitting said utility usage data from said utility usage data processing means to a remote data receiving apparatus;
providing access means to said means for transmitting said utility usage data in the event said means for transmitting said utility usage data is found to be in use;
transmitting confirmation from said data receiving apparatus to said utility usage processing means of the reception of said utility usage data; and
repeating said transmission of said utility usage data to said data receiving apparatus a predetermined number of times in the event said confirmation is not received by said utility usage processing means; and in the event said transmission of said utility usage data to said data receiving apparatus is not thereby successful, initiating the identification and repair of any malfunction in said utility usage monitoring means, utility usage data processing means, and said means for transmitting said utility usage data from said utility usage data processing means to a remote data receiving apparatus.

44. The method of claim 43 wherein said access means comprises providing a bypass line and switching means therefor by which a telephone line to which said means for transmitting said utility usage data is connected can be disconnected, and
a) disconnecting with said switching means said telephone line from connection thereof to an outside line to a utility company, and
b) connecting with said switching means said bypass line to said outside line to a utility company upon a finding that said outside line to a utility company was being otherwise used.

45. The method of claim 43 wherein said utility usage data processing means comprises programmable microprocessor means and memory, and
a) programming said microprocessor means to receive and store utility usage data;
b) storing in said memory the telephone numbers of computers of those utility companies whose services are being utilized;
c) storing in said memory said utility usage data; and
d) transmitting said utility usage data to that selected one of said those utility companies whose services are being utilized that had provided the utility for which said utility usage data had been utilized.

* * * * *